US011018997B2

(12) United States Patent
Scanlon et al.

(10) Patent No.: US 11,018,997 B2
(45) Date of Patent: May 25, 2021

(54) SYSTEMS AND METHODS FOR MAINTAINING A CONVERSATION

(71) Applicant: Disney Enterprises, Inc., Burbank, CA (US)

(72) Inventors: Raymond Scanlon, Burbank, CA (US); Douglas Fidaleo, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 146 days.

(21) Appl. No.: 15/952,135

(22) Filed: Apr. 12, 2018

(65) Prior Publication Data
US 2019/0319898 A1 Oct. 17, 2019

(51) Int. Cl.
*H04L 12/58* (2006.01)
*G06N 20/00* (2019.01)
*G06F 16/9535* (2019.01)
*G06F 40/295* (2020.01)

(52) U.S. Cl.
CPC .......... *H04L 51/02* (2013.01); *G06F 16/9535* (2019.01); *G06F 40/295* (2020.01); *G06N 20/00* (2019.01)

(58) Field of Classification Search
None
See application file for complete search history.

(56) References Cited

U.S. PATENT DOCUMENTS

| 2016/0163311 A1* | 6/2016 | Crook | G10L 15/183 |
| | | | 704/275 |
| 2017/0048170 A1* | 2/2017 | Smullen | H04L 67/02 |
| 2018/0212904 A1* | 7/2018 | Smullen | H04L 67/322 |
| 2019/0182382 A1* | 6/2019 | Mazza | H04M 3/527 |
| 2019/0279642 A1* | 9/2019 | Shukla | G06K 9/00 |

FOREIGN PATENT DOCUMENTS

WO  WO-2010071112 A1 *  6/2010  ............. G06F 16/36

OTHER PUBLICATIONS

Anne Tissen, "A case-based architecture for A dialogue manager for information seeking," in SIGIR, 1991, pp. 152-161. (Year: 1991).*

* cited by examiner

*Primary Examiner* — Chris Parry
*Assistant Examiner* — Abderrahmen Chouat
(74) *Attorney, Agent, or Firm* — Sheppard Mullin Richter & Hampton LLP

(57) ABSTRACT

Systems and methods for an interactive communications system capable of generating a response to conversational input are provided. The interactive communications system analyzes the conversational input to determine relevant topics of discussion. The interactive communications system further determines which of the relevant topics of discussion can potentially lead to an unwanted end to a conversation. The interactive communications system redirects the conversation by providing responses to the conversational input that are intended simply to avoid the unwanted end to the conversation.

20 Claims, 5 Drawing Sheets

SYSTEMS AND METHODS FOR MAINTAINING A CONVERSATION

TECHNICAL FIELD

The present disclosure relates generally to interactive communications systems. More particularly, some embodiments of the present disclosure are directed to providing responses conversational inputs designed to engage a human participant in conversation.

DESCRIPTION OF THE RELATED ART

Chatbots refer to computer programs that can conduct a conversation with a human counterpart or participant. Such computer programs are designed to respond to textual and/or auditory (spoken) inputs in a way that attempts to convincingly simulate an actual human-to-human interaction. Other interactive communication systems use interactive agents that may be automatons, puppets, or human actors. These interactive agents engage a human participant in a conversation and can be used as virtual assistants, for entertainment purposes, as well as for promoting products and/or services. Such interactive communications systems are often provided with pre-scripted responses to some conversational input. The pre-scripted responses can be selected using computer programs focused on achieving a particular end-goal, such as engaging a human participant in an interactive story, and guiding the participant through the interactive story until it ends.

BRIEF SUMMARY OF THE DISCLOSURE

In accordance with one embodiment, a method comprises receiving conversational input, and determining a likelihood that the conversational input comprises a current conversational topic that will terminate earlier than desired. Additionally, based on the determined likelihood, the method comprises seeking out opportunities to segue the current conversational topic to one or more alternative conversational topics. Seeking out opportunities may include predicting an end to the current conversational topic based on the conversational input, analyzing the conversational input for cues associated with the alternative conversational topics, and selecting one or more conversational responses associated with the alternative conversational topics to the conversational input.

In some embodiments, the conversational input is received from a human participant of the conversation. In some embodiments, predicting the end to the conversation comprises parsing the conversational input, and extracting one or more keywords or phrases indicative of at least one of a context of the conversation, an entity providing the conversational input, and one or more topics relevant to the conversation.

In some embodiments, the method further comprises characterizing at least one of the context of the conversation. In some embodiments, the entity providing the conversational input, and the one or more topics relevant to the conversation are based upon one or more biometric identifiers of the entity providing the conversational input.

In some embodiments, the method further comprises characterizing the one or more topics based upon one or more of the context of the conversation and the entity providing the conversational input.

In some embodiments, predicting the end to the conversation further comprises generating a tree structure characterizing a current state of the conversation, wherein each of the one or more topics is represented by a node of the tree structure. In some embodiments, the method may comprise updating the tree structure with additional topics as the conversation progresses based upon additional conversational input. In some embodiments, predicting the end to the conversation further comprises analyzing the tree structure, and determining which of the one or more topics cannot be associated with at least one of knowledge and pre-scripted responses available for presentation to the provider of the conversational input.

In some embodiments, analyzing the conversational input for conversational continuation topics comprises determining which of the one or more topics are associated with at least one of knowledge and pre-scripted responses available for presentation to the provider of the conversational input.

In some embodiments, analyzing the conversational input for conversational continuation topics comprises determining which of the one or more topics associated with the at least one of the knowledge and pre-scripted responses available for presentation to the provider of the conversational input have been previously discussed during progression of the conversation.

In some embodiments, selecting the one or more conversational responses to the conversational input that avoid the predicted end of the conversation comprises the at least one of the knowledge and pre-scripted responses available for presentation to the provider of the conversational input that have not been previously discussed during the progression of the conversation.

In some embodiments, the selection of the one or more conversational responses to the conversational input is based upon non-linear traversal of the tree structure.

In some embodiments, the non-linear traversal of the tree structure comprises selecting the one or more conversational responses to the conversation input that are associated with a sub-topic of one of the one or more topics not previously discussed during the progression of the conversation.

In some embodiments, the non-linear traversal of the tree structure comprises selecting the one or more conversational responses to the conversation input that are associated with a subsequent topic whose subject matter is unrelated to that of a previously discussed topic of the one or more topics.

In accordance with another embodiment, a method comprises receiving from a human participant in a simulated conversation, a conversational input. One or more topics are identified for continued discussion during the simulated conversation from the conversational input. A determination is made regarding which of the one or more topics are associated with at least one possible response to the conversational input. The simulated conversation is directed to avoid a first subset of the one or more topics which are not associated with at least one possible response to the conversational input. This is done while maintaining engagement of the human participant in the simulated conversation by generating one or more responses to the conversational input based upon a second subset of the one or more topics which are associated with the at least one possible response to the conversational input.

In some embodiments, the human participant is engaged in the simulated conversation with an interactive agent or a computerized interactive communications system. In some embodiments, directing the simulated conversation to avoid the first subset of the one or more topics comprises switching to a topic of the second subset of the one or more topics in a non-linear fashion.

In some embodiments, the topic of the second subset of the one more topics comprises a topic previously discussed during the simulated conversation having a related sub-topic that was not previously discussed during the simulated conversation.

In some embodiments, the topic of the second subset of the one or more topics is substantively unrelated to a previous topic of the one or more topics discussed during the simulated conversation.

In some embodiments, the method further comprises avoiding generating one or more responses to the conversational input based upon a previous topic of the one or more topics discussed during the simulated conversation.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
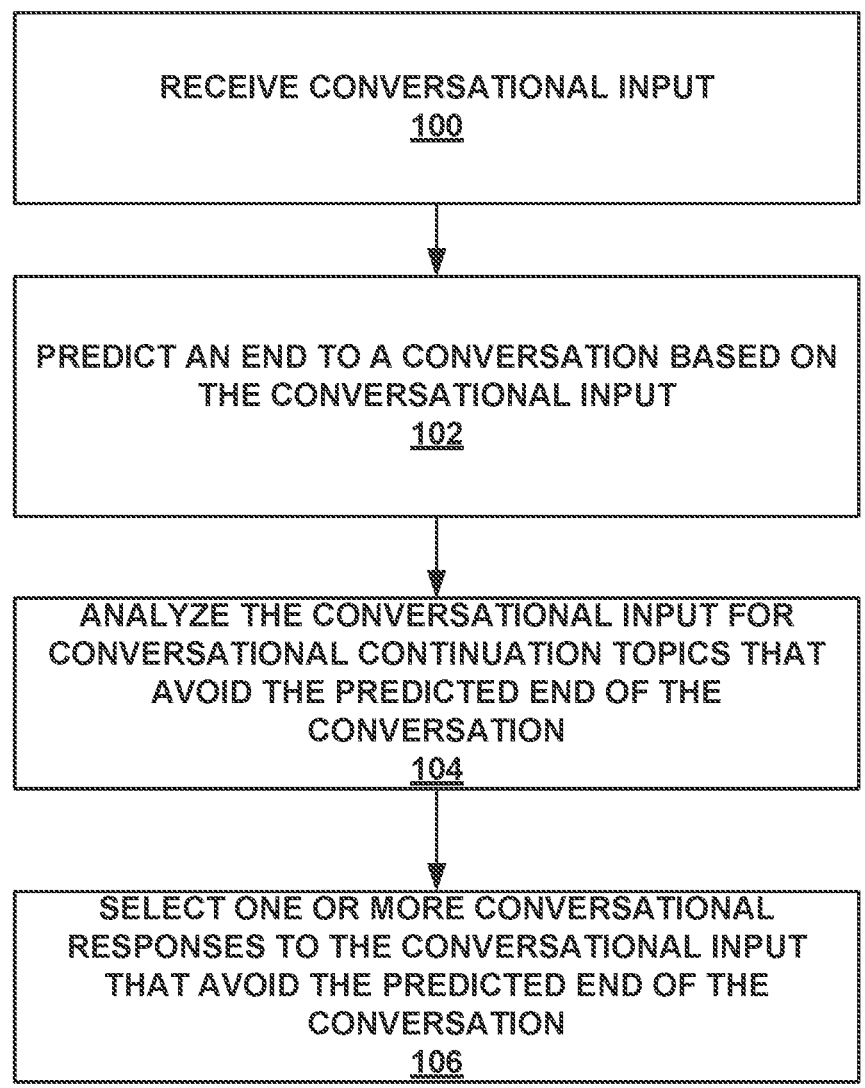
FIG. 1 is a flow chart illustrating example operations that can be performed to maintain a conversation in accordance with one embodiment.

The figures are not exhaustive and do not limit the present disclosure to the precise form disclosed.

DETAILED DESCRIPTION

Conventional interactive communications systems are often designed to simulate human-to-human interactions. That is, such systems are configured to provide responses to human language or conversational inputs in a manner that is natural. One feature of satisfying conversations is graceful segues between topics. On one hand, conversations avoid abrupt topic changes while on the other hand segue to new topics with varying degrees of grace as knowledge about a topic wanes. Conventional interactive communications systems tend to be goal-driven which values staying on topic until the conversational goal is reached. That is, conventional interactive communications systems are often designed to provide responses to conversational inputs for the purpose of guiding a human participant towards an end-goal. For example, interactive agents used on retailer websites can be designed to respond to conversational inputs in such a way that the human participant receives information relevant to a purchase decision.

However, in more casual conversations with little or no emphasis on goals, as is the case with human-to-human interactions, certain points in a conversation can lead to dead ends or some unwanted break in the conversation. This occurs, for example, when one conversant has exhausted their knowledge on a particular topic. In these situations, interactive communications systems that rely on a directed structure, such as those that provide pre-scripted responses to language input, lack the ability to keep the conversation going. For example, if a conventional interactive communications system reaches a point where pre-scripted content no longer exists, the interaction comes to an abrupt, sometimes awkward end.

Accordingly, various embodiments described in the present disclosure are directed to systems and methods of maintaining a conversation with a human participant. Rather than being designed to direct a human participant to some end-goal or purpose, various embodiments are designed to facilitate "un-purposeful" or non-goal oriented conversation, e.g., small talk, which may or may not be part of a broader/larger interaction. Responses to conversational inputs are generated, where the responses are intended to keep a conversation going, thereby avoiding an undesirable end to the conversation. These types of conversations may be entertaining in and of themselves, or they may pass time while participants gather for a meeting, a scene is set for a show, or more information is gathered in the background.

Topics in a conversation may be identified so that the conversation can be represented with or characterized by a tree structure. Based upon the various topics (or sub-topics) making up the tree structure, potential dead ends in the conversation can be anticipated, e.g., topics for which few or no further response(s) can be generated. To avoid these potential dead ends, systems in accordance with various embodiments of the present disclosure look for opportunities to segue into alternative topics so as to enable responses to conversational input from a human participant based upon the alternative topic(s). For example, a graceful segue may redirect to topics that have been mentioned or brought up previously in the conversation. Smooth topic transition opportunities might also be presented by external events such as time of day, weather, news events and the like alone or in combination with opportunities presented by prior conversation. As a current topic branch becomes increasingly likely to terminate, the system in accordance with the present invention can more aggressively seek these opportunities. In this way, the conversation can be redirected to another topic for which the interactive communications systems and methods of the present disclosure have a response, thereby keeping the conversation going.

For example, a particular topic in a conversation tree may be analyzed, and it may be determined that no further paths or branches in the conversation tree stem from that topic, i.e., no further response/knowledge is available to maintain a conversation regarding that particular topic. In this case, another topic is brought up through some generated response, where this other topic is identified as being one for which the system has paths/branches to follow. It should be noted that in analyzing a conversation tree, the system may look ahead along existing paths or branches so as to begin more aggressively searching for other topics before reaching a path or branch that ends. Moreover, the system may remember, e.g., by maintaining a cache, of potential topics to transition over to. By determining a need to change topics earlier on during a conversation, the transition to the new topic can be made smoother or more graceful, as the transition can occur while traversing multiple points along a path or branch. In fact, the introduction of a new topic earlier on, as opposed to at the end of the path or branch (which can lead to an abrupt segue) may result in additional or alternative topics being discovered.

Figure 2A:
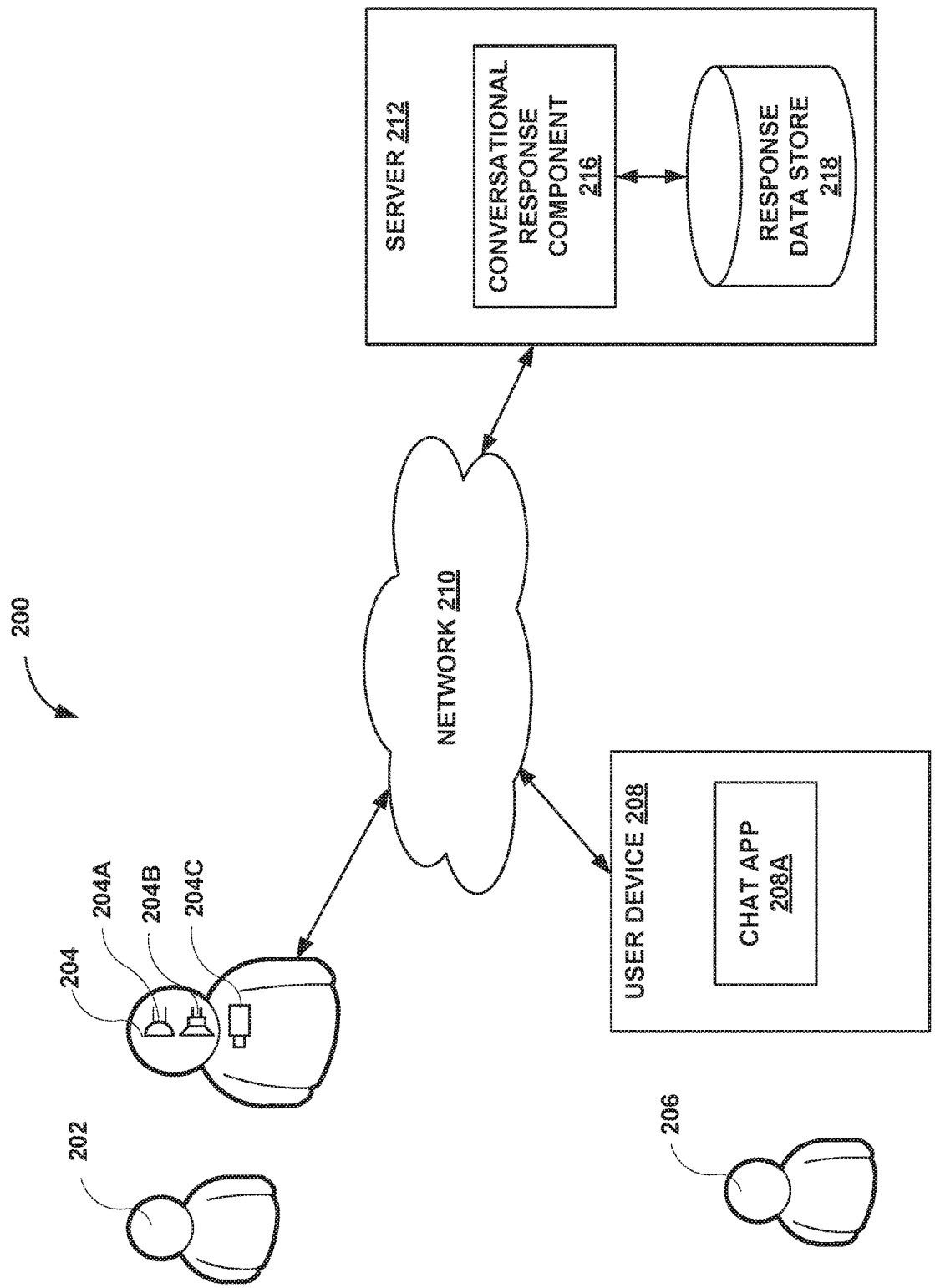
FIG. 2A is a schematic representation of an example architecture of an interactive communications system in which conversation maintenance can be achieved in accordance with various embodiments.
Figure 2B:
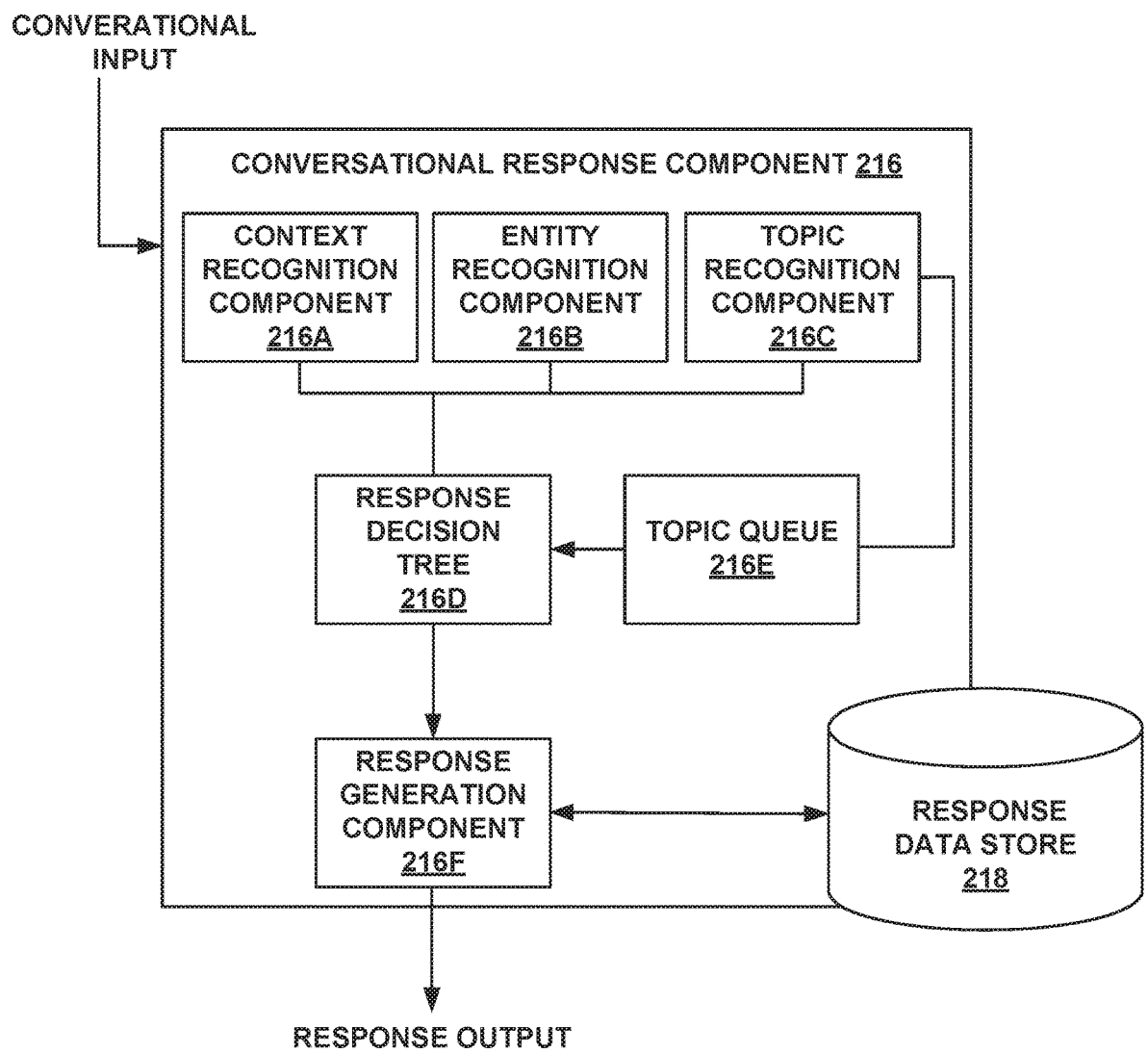
FIG. 2B is a schematic representation of an example conversational response component of the interactive communications system of FIG. 2A.
Figure 2C:
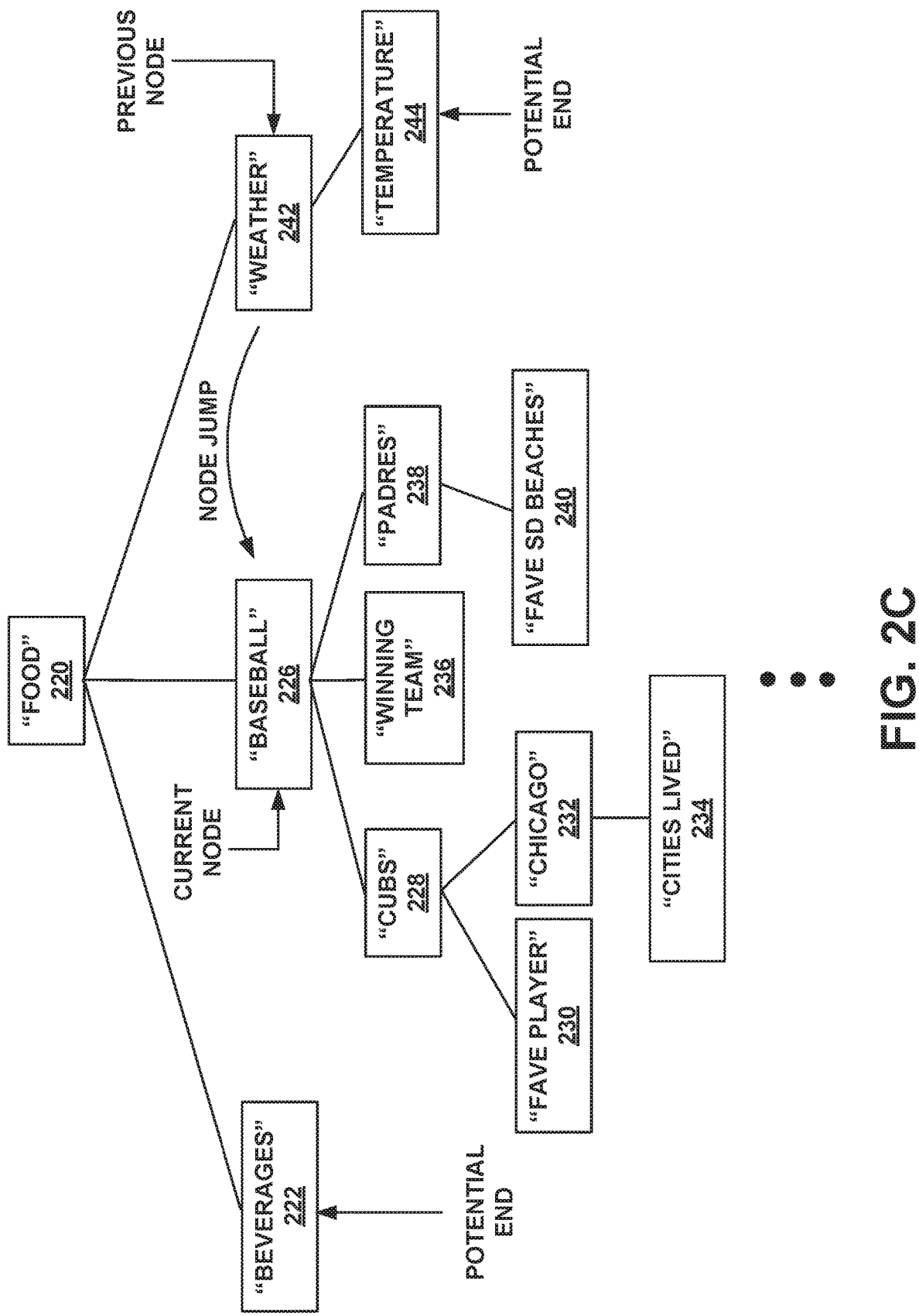
FIG. 2C is a schematic representation of a topic decision tree that be used by the conversational response component of the interactive communications system of FIG. 2A.

FIG. 1 is a flow chart illustrating example operations that may be performed in accordance with various embodiments to maintain a conversation with non-purposeful responses, e.g., small-talk. FIG. 1 will be described in conjunction with FIGS. 2A, 2B, and 2C. FIG. 2A illustrates a schematic representation of an interactive communications system in accordance with various embodiments. FIG. 2B illustrates a schematic representation of a conversational response component of the interactive communications system of FIG. 2A. FIG. 2C illustrates an example tree structure generated based upon conversational input received from a human participant.

Referring to FIG. 1, a conversational input is received at operation 100. Based on the conversational input, a likelihood that the conversational input comprises a current conversational topic that will terminate earlier than desired can be determined. Based on the determined likelihood, opportunities to segue the current conversational topic to one or more alternative conversational topics can be sought out.

A conversational input may be some human language input that is supplied via human voice, typed text, signed (e.g., performed using sign language), some combination thereof or any available means of meaningful communication using a language system with a meaning that can be interpreted by machines. For example, as illustrated in FIG. 2A, a human participant 202 may be conversing with an interactive agent 204 in a live event environment where a simulated conversation is to take place, such as a reception area of a restaurant, hospital waiting room, etc. Interactive agent 204 may be a human interactive agent, an animatronic interactive agent, or other conversational counterpart to human participant 202. A microphone 204A or other sound reception mechanism may be used to receive the audible conversational input from human participant 202. Other sensor technology is used to detect images, vibrations, gestures, sounds, depending on the features of the communication that is occurring. In the case of an animatronic, computerized, or other non-human interactive agent, a speaker 204B or other sound delivery mechanism may be used to present a response to human participant 202. In the case of a human interactive agent, speaker 204B may be used to provide a response that the human interactive agent is to repeat to human participant 202. In some embodiments, interactive agent 204 may have one or more sensors, such as sensor 204C, which may be a motion sensor, camera, or similar sensor for receiving visual, conversational input, e.g., sign language performed by human participant 202. Sensor 204C may also be used to obtain contextual clues or identifiers from human participant 202, such as shrugging shoulders, eye movement, etc. that can be used to further characterize conversational input from human participant 202.

Delivery of responses to human participant 202 by interactive agent 204 may be controlled through a conversational response component 216 communicatively connected to interactive agent 204 through network 210 vis-à-vis a server 212. That is, conversational input received by interactive agent 204 may be relayed, through network 210, to server 212.

Network 210 may be any communications network such as a cellular or data network, a satellite network, an intranet, an extranet, a virtual private network (VPN), a local area network (LAN), a wireless LAN (WLAN), a wide area network (WAN), a personal area network (PAN), a portion of the Internet, a portion of the Public Switched Telephone Network (PSTN), or any combination thereof. Accordingly, network 210 may employ various communication media, such as a coaxial cable, fiber optic cable system, Ethernet, radio waves, etc. Further still, network 210 may be one or more combinations of any of the aforementioned networks.

Conversational response component 216, in conjunction with response data store 218, determines an appropriate response to conversational input received from human participant 202. The response may be forwarded to interactive agent 204 through network 210, whereupon interactive agent 204 delivers the response to human participant 202.

In another scenario, a human participant 206 may be conversing with a chat application 208A, e.g., a chatbot, or other computerized, interactive conversation system interface implemented on a user device 208. User device 208 may be a smart phone, laptop, tablet computer, or other device having sufficient programming and computational resources to implement a conversational user interface. Chat application 208A may provide a mechanism for human participant 206 to compose or otherwise submit a conversational input, such as a chat window configured to receive one or more statements, phrases, questions, or other forms of language input. Chat application 208A may be operatively connected to a microphone (not shown) or other auditory-gathering device for receiving, e.g., spoken conversational input, as well as a speaker (not shown) for presenting human participant 206 with a response to the conversational input.

Like interactive agent 204, the interactive communications aspect/functionality of chat application 208A may be provided by conversational response component 216 in conjunction with response data store 218. Access to conversational response component 216 and response data store 218 can be effectuated through server 212. For example, chat application 208A may be a web-based chat application that is part of an online game, online chat service, or online information service provided by an online service provider operating server 212.

Response data store 218 may comprise one or more corpora or other data sources upon which responses to conversational inputs can be based. For example, response data store 218 may be a knowledge data store or other information repository accessed by conversational response component 216 to retrieve data to be included in a response to a language input. That is, response data store 218 may comprise a listing, table, or other organized set of keywords or topics, each of which may be associated with factual information associated with the keywords or topics. Response data store 218 may also be a corpus of response phrases that conversational response component 216 may access in order to retrieve an appropriate phrase or word(s) in response to a conversational input. For example, response data store 218 may comprise a table or listing of conversational keywords or topics that are associated with phrases, e.g., questions, that may be used in response to conversational input containing those keywords or topics. Additionally, other data such as contextual clues, identifiers of entities, etc. may be associated with the keywords or topics to further classify or categorize the conversational input in order to obtain an appropriate response. Moreover, relationships between keywords or topics can be reflected in response data store 218 to provide various manners of responding to the conversational input. Although a single response data store is illustrated in FIG. 2A, more than one response data store can be utilized in accordance with other embodiments.

Other approaches for online-based operations may be used, or interactive communications system 200 may be implemented as a local and/or stand-alone application or service resident, for example on user device 208. That is, conversational response component 216 and response data store 218 may be implemented on user device 208. In still other embodiments conversational response component 216 may be locally implemented on user device 208, while response data store 218 may be remotely located and accessed, e.g., via network 210 or one or more other networks. Depending on the context in which interactive communications system 200 is being utilized and/or the complexity of conversations interactive communications system 200 is likely to be engaged in, a particular architecture may be more suitable. For example, an architecture in which conversational response component 216 and response data store 218 are both locally implemented may be more suitable for scenarios in which the conversation is likely to be more simplistic, thereby requiring a smaller corpus of knowledge/topics that need to be stored in response data store 218. Accordingly, the processing power, memory capabilities of user device 208 may be sufficient. A web-based scenario, such as when chat application 208A is presented via a webpage, conversational response component 216 and response data store 218 may be more appropriately implemented on a server, e.g., server 212, that is remotely accessible.

Referring back to FIG. 1, an end to a conversation based on the conversational input is predicted at operation 102. That is, depending on the likelihood that the conversational input comprises a current conversational topic will terminate earlier than desired, opportunities to segue the current conversational topic can include predicting an end to the current conversational topic based on the conversational input.

Referring to FIG. 2A, during exchanges between, e.g., human participant 202 and interactive agent 204, one or more keywords indicative of a conversational context and topics that can be discussed in the conversation are identified. It should be understood that keywords can be identified in various ways. In accordance with one example, keywords can be manually identified as being related to a particular topic(s). Accordingly, the identification of a particular utterance during a conversation can signify the conversational context and/or topics that can be discussed. In accordance with another example, semantic similarity or distance may be used, e.g., a metric regarding particular terms can be defined so as to signify a certain likeness of meaning between two or more words. Further still, rather than keywords, a particular intent to a conversational input or utterance may be identified and used to determine a conversational context or topic of discussion (described below).

Prior to the occurrence of any conversation, response data store 218 may be populated with known topics and responses to questions or conversational prompts regarding those topics as noted previously. A tree structure can be created around these topics, an example of which is illustrated in FIG. 2C and discussed in greater detail below. When a path or branch ends, it is indicative of an end to the conversation.

Referring to FIG. 2B, conversational input received by conversational response component 216 is processed to determine the context of the conversational input using a context recognition component 216A. Context recognition component 216A may analyze the conversational input to identify one or more keywords, phrases, rhythms, intonations, vocal qualities, punctuation, sentence structure and the like that indicate the context of the conversational input. In other words, context recognition component 216A can identify the circumstances, setting, condition(s), tone, etc. that can aid in determining the meaning, sentiment, or intent of the speaker in uttering the conversational input. For example, the presence of certain keywords or phrases in the conversational input, such as "why," "how come," "do you know," etc. may indicate that a question is being asked by human participant 202 or 206. As another example, the detection of vocal qualities or intonations associated with certain words or phrases may signify relative importance, e.g., human participant 202 may utter a word or phrase using a louder voice indicating that word or phrase is of greater importance than other words or phrases uttered by human participant 202. As another example still, context may be determined by analyzing neighboring words or phrases, e.g., human participant 202 uttering the words "water" and "ice" closely in time may suggest an indication of thirst, whereas the word "water" followed closely by "garden" likely suggests human participant 202 is discussing watering plants.

Interactive agent 204 may have a sensor 204C for sensing one or more features or actions of human participant 202, such as a shoulder shrug or facial expression. These features or actions may also be used by context recognition component 216A to determine or further refine the determination of a probable context of the conversational input. For example, following the above example, recognition of the word "why" can confirm the conversational input is question based on sensor 204C sensing that human participant 202 shrugged his/her shoulders simultaneously while uttering the word "why."

An entity recognition component 216B of conversational response component 216 may determine who or what is providing the conversational input. Entity recognition component 216B may parse one or more keywords or phrases from the conversational input and/or leverage biometric identifiers to determine who human participant 202/206 is. For example, entity recognition component 216B may extract certain keywords or phrases indicative of conversational input that is likely spoken by a child or an adult. Entity recognition component 216B may analyze the sentence structure of the conversational input as a way to determine whether human participant 202/206 is a child or adult. Entity recognition component 216B may leverage identified features or actions or other sensor-based information. For example, sensor 204C, which may be a camera, may capture an image of human participant 202 and determine the height of human participant. This height information may be used to characterize human participant 202 as being a child. Alternatively or in addition, entity recognition component 216B may use explicitly provided data such as an RFID or barcode-based identification card, self-identification entered by user 202/206, and the like to recognize a user. However recognition is accomplished, recognition component 216B may access external resources to aid its operation, such as a speaker dependent speech model, vocabulary list, native language, communication style and the like associated with a particular recognized user.

A topic recognition component 216C of conversational response component 216 may determine subjects or topics that are brought up in the conversational input, and could be discussed in a conversation with human participant 202/206. In some embodiments, the keywords and/or phrases extracted by either context recognition component 216A or entity recognition component 216B may be analyzed to determine relevant topics. For example, proper nouns, key nouns, names, objects and other such keywords or phrases can be determined as being suggestive of topics brought up by human participant 202/206. Accordingly, topic recognition component 216C may not consider words, such as determiners, adverbs, etc. that do not generally suggest a topic or subject. Topic recognition component 216C may also use features or actions associated with human participant 202/206, as well as determinations made by context recognition component 216A and/or entity recognition component 216B to further refine determination of a topic. For example, topic recognition component 216C may analyze the conversational input, and based on certain extracted keywords determine that the topic of a sport, e.g., baseball, has been mentioned. Based on a determination by context recognition component 216A, entity recognition component 216B, and/or features indicating that human participant 202/206 is a child determined by sensor 204C, topic recognition component 216C may further characterize the topic baseball as being little league baseball. In some embodiments, this analysis may be done once, and any extracted words/phrases can be stored and later re-used. For example, conversational response component 216 may learn that a particular set of keywords is indicative of a particular topic, that topic may be stored in response data store 218 (along with an appropriate response). Upon a subsequent use or instantiation of conversational response component 216, topic recognition component 216C may first look for keywords present in the conversational input that could correlate to topics already stored in response data store 218.

In some embodiments, the number of times a keyword, phrase, object etc., that is associated with a topic has been mentioned by human participant 202 can be recorded, counted, or noted. This can be used as an indicator or prompt to direct or segue the conversation in the direction of that topic.

Any one or more of the aforementioned response components 216A-216C can be implemented as a hardcoded algorithm/software in which matching operations can be performed to match one or more keywords resulting from the parsing process with keywords correlated to a particular context, entity, and/or topic. In some embodiments, any one or more of the aforementioned response components 216A-216C may be implemented by a trained machine learning classification model. That is, one or more of context recognition component 216A, entity recognition component 216B, and topic recognition component 216C may be trained with one or more examples for identifying contexts, entities, and/or topics, respectively. Training mechanisms, e.g., a random force model, a support vector machine, a neural network, etc. that utilize algorithms such as logistic and/or linear regression to make such predictions/determinations, may be used to train one or more of response components 216A-C. Moreover, one or more weighting mechanisms may be used when making the above-described predictions/determinations in order to validate or enhance the validity of the predictions/determinations. For example, terms or phrases present in conversational input may suggest different possible topics, context, and/or entities, and a value or probability score can be assigned to these terms or phrases depending on their likelihood of accurately predicting the context, topic, and/or entity intended by human participant 202/206. One or more of response components 216A-C may learn how to assign such weighting based on the training mechanisms.

An example topic-based tree structure is illustrated in FIG. 2C (also referred to as response decision tree 216D shown in FIG. 2B. Response decision tree 216D may be a data structure that represents a flow or map that can be traversed during a conversation to maintain the conversation through graceful segues from one topic to another topic (or subtopic). Topics may be represented as nodes that may or may not have one or more paths or branches extending therefrom representative of additional topics or subtopics that can be the basis for a response, i.e., that keep a conversation going. A node without any paths or branches extending therefrom is indicative of dead end or conclusion of the conversation focused on that topic. It should be understood that determining a node has no paths or branches leading to further conversation may entail accessing response data store 218 to determine whether or not a response to a conversational input regarding a particular topic exists. If no response exists in response data store 218, that topic is determined to be a dead end topic.

In some embodiments, the tree structure may be created beforehand. That is, based on topics, contexts, entities that are either predetermined using the aforementioned training mechanisms and input into response data store 218, a tree structure reflecting the predetermined topics, contexts, and entities and potential responses is generated. In some embodiments, the tree structure can be based on data learned from previous conversations. In some embodiments, human analysis of previous conversations can be used to train components 216A-C of conversational response component 216.

A topic queue 216E may be used to cache or log the most recent or some historical progression of topics that have been discussed or mentioned in the conversation. Once a conversation begins, a topic queue can be generated. This topic queue can provide a mechanism for determining what branch of the tree structure can be traversed to avoid an end to the conversation. The topic queue can take various forms, such as a last-in-first-out queue, e.g., the most recent conversational input from a conversant can be designated the most relevant or adjacent topic to jump to in the tree structure. For example, upon nearing the end of a branch in the tree structure, the topic queue 216E can be analyzed, e.g., by applying heuristics, such as how recent an identified topic was mentioned, how important an identified topic is to the conversation, etc.

One of the topics in topic queue 216E may be selected, and response generation component 216G can jump to a branch of the tree structure supporting that selected topic to avoid an end to the conversation. That is, response generation component 216G may halt its traversal along a current branch, and based on the selected topic in topic queue 216E, move to a branch(es) associated with the selected topic. In this way, conversational response component 216 is aware of topics and/or specific responses from response data store 218 that can be used as a basis for a response to conversational input. Topic queue 216E may also be accessed and analyzed to determine if a topic has already been discussed. This avoids a potentially awkward point in the conversation in which a response is repeated to human participant 202/206. That is, topic queue 216E can be used as a pointer to one or more nodes of response decision tree 216D indicating a topic that is to be discussed and/or was previously discussed. In some embodiments, nodes and/or branches can be invalidated, where invalidated nodes or branches are no longer valid options for continuing a conversation. It should be noted that objects, nouns, and/or other words or phrases may be tracked in addition to topics to support non-linear traversal of response decision tree 216D, e.g., the switching of topics. Moreover, by tracking such words or phrases, ambiguous or non-specific conversational inputs, such as words like "it" or "that," can be resolved, e.g., related to a specific topic. Accordingly, in some embodiments a secondary word recognition and queue 216F, may maintain a queue(s) of words identified in any one or more of components 216A-C (but not necessarily considered when making context, entity, and/or topic recognition determinations at those components) that can be tracked to support traversal of response decision tree 216D. Secondary word recognition and queue 216F may adjust/update topic queue 216E to accurately reflect the state of traversal of topics. For example, the word "it" by one or more of components 216A-C may be recognized by secondary word recognition and queue 216F as relating to a previously identified topic. Upon the identification of the word "it" in a current conversational input, secondary word recognition and queue 216F can relate the word to the appropriate topic, and topic queue 216E can be adjusted to reflect that the conversation has involved some discussion of that topic.

By analyzing response decision tree 216D and by analyzing what nodes in response decision tree 216D have been traversed vis-à-vis topic queue 216E, conversational response component 216 can identify potential dead ends to the conversation and determine how close the current conversation state is to a potential dead end. One technique is to simply count the remaining nodes remaining in a branch or sub-branch where a lower count indicates increasing likelihood of reaching a potential end. Alternatively or in addition, the nodes might be weighted such that nodes nearer a potential end have a greater weight (and corresponding greater influence on the decision to seek out alternative conversation topics) than to nodes that are farther from a potential end. Moreover, the analysis may also give weight to whether smooth transition topics have been identified in, e.g., operation 104 (described in reference to FIG. 1). Once the system has identified an alternative topic that has a deep node tree, it may be less disruptive to continue with the current topic tree for a while longer before jumping topics since the risk of abrupt stop has been mitigated, or it may be desirable to switch topics immediately to ensure the new topic can be explored.

Yet another weighting scheme might give particular nodes that have notable ability to support a conversation segue a higher weight. That is, a node might correspond to a conversation segment that is authored with several segue "hooks" that support jumps to one or more alternate topics and those nodes could be weighted to inform the analysis that it would be a good opportunity to jump topics at this node. For example, the topic of "animals" may be identified, and nodes associated with that topic can be used to generate response decision tree 216D (or referenced while analyzing possible branches of response decision tree 216D to pursue). Directing or continuing a conservation based on the topic of animals may be favored in the event that there are more possibilities (nodes/branches) that flow from this topic. In response to conversational input "Hey, do you know what my favorite animal is?," nodes of response decision tree 216D may provide response options regarding favorite animals, pets, which can then lead to conversations about endangered species, the environment, etc.

Accordingly, at operation 104 of FIG. 1, the conversational input is analyzed for conversational continuation topics that avoid the predicted end of the conversation. In other words, the conversational input can be analyzed for cues associated with alternative conversational topics. To accomplish this, response generation component 216G may analyze response decision tree 216D as well as the topic queue 216E. That is, response generation component 216G may determine possible responses set forth in response decision tree 216D commensurate with a topic in topic queue 216E, while also avoiding topics that topic queue 216E has indicated or has identified as being a previously-discussed topic. For example, certain keywords or phrases mentioned in the conversation and extracted from the conversational input can provide topics to jump to in order to avoid ending the conversation.

At operation 106, one or more conversational responses to the conversational input are selected that avoid the predicted end of the conversation, e.g., those responses associated with alternative topics to the conversational input. To that end, response generation component 216G retrieves an appropriate response to the conversational input from response data store 218 based on a selected topic from topic queue 216E. That is, response generation component 216G may jump to a particular node of response decision tree 216D commensurate with the selected topic. Response data store 218 maintains responses associated with, e.g., keyed to topics (or sub-topics), and based on the selected topic, an appropriate response can be retrieved and output by response generation component 216G.

An example below describes traversal of a tree structure in real or near real-time as a conversation between human participant 202 and interactive agent 204 progresses.

Referring to FIG. 2C, conversational input can be received from a human participant, e.g., human participant 202 conversing with interactive agent 204 in a waiting room of a restaurant. For example, human participant 202 may be waiting to be seated at a table. In order to engage human participant 202 while he/she is waiting, interactive agent 204 may begin a conversation by saying "Hello. How are you?" Human participant 202 may respond with conversational input, e.g., "I just came from a baseball game. It was hot outside, and I'm thirsty."

Based on this first conversational input, conversational response component 216 may identify the keywords "baseball," "hot," and "thirsty." Conversational response component 216 may, based on context recognition (determined by context recognition component 216A) and/or one or more identified features or actions on the part of human participant 202 (determined by entity recognition component 216B in conjunction with data from sensor 204C), determine that human participant 202 is a patron of the restaurant waiting to be seated. In some embodiments, an initial topic(s) may be a default topic, such as food in this case (represented by node 220). The default topic may be selected based upon the environment in which interactive agent 204 is being employed. In some embodiments, an initial topic(s) may be determined from the first conversational input from human participant 202.

Topic recognition component 218C (alone or in conjunction with entity recognition component 216B, for example) may further determine, based on the first conversational input, that additional topics of conversation can include "beverages" (represented as node 222), "baseball" (represented as node 226), and "weather" (represented as node 242). Moreover, the topics of baseball, weather, and drinks may be cached in topic queue 216C. In this way, if a conversation regarding the initial topic of food is coming to an end, the topics of baseball, weather, and/or drinks present possible topics to segue the conversation.

Based on responses/knowledge stored in response data store 218, conversational response component 216 may determine that a topic in response to the weather topic mentioned in the first conversational input may be "temperature" (represented as node 244). However, response data store 218 may not have any further response based on temperature, indicating it is a potential dead end topic. That is, if conversational response component 216 were to respond to the first conversational input with "Really. How hot was it?" and human participant 202 were to respond with "95 degrees," conversational response component 216 would have no further response. In some embodiments, conversational response component 216 may determine that the weather topic should be avoided altogether. In some embodiments, conversational response component 216 may determine to proceed with the temperature topic response and subsequently jump nodes to another topic.

Based on responses/knowledge stored in response data store 218, conversational response component 216 may determine that a topic in response to the beverages topic mentioned in the first conversational input may be "favorite beverages." Conversational response component 216 may determine that the topic favorite beverages is also a dead end topic. Accordingly, rather than pursuing that topic of conversation, conversational response component may jump from the topic of weather (node 242), e.g., a previous node, to the topic of baseball (node 226), e.g., the current node. Accordingly, conversational response component 216 may respond to human participant 202 by stating "What teams played today?" It should be noted that in some embodiments, intermediate utterances or responses can be provided in order to smooth the transition to another topic. An example may be introduction of a non sequitur, e.g., "So you were saying before that . . . "

It should be noted that conversational response component 216 is not necessarily bound by the tree structure in terms of where/when to jump to another topic node. Moreover, conversational response component 216 need not follow a topic to its end. Further still, conversational response component 216 may elect to jump "backwards" to a node higher in the tree structure, so long as the topic has not yet been broached or discussed. As also previously noted, conversational response component 216 is able, via topic queue 216E, to determine a current topic of discussion and any previous topics of discussion.

Human participant 202 may provide an additional conversational input by stating "The Cubs and the Padres played today." Based on this conversational input, conversational response component 216 may extract the keywords "Cubs" and "Padres," as being indicative of additional topics and store or cache them as part of topic queue 216E: node 228 (representative of the topic "Cubs"); node 230 (representative of the topic "favorite player"); node 232 (representative of the topic "Chicago"); node 234 (representative of the topic "cities lived in"); node 236 (representative of the topic "winning team"); node 238 (representative of the topic "Padres"); node 240 (representative of the topic "favorite beaches in San Diego"). Accordingly, conversational response component 216, based on these topics, may continue to respond to conversational inputs from human participant 202 to keep the conversation going, e.g., until human participant is ready to be seated.

Selection of responses to conversational inputs by conversational response component 216 may be non-linear in that a topical path or branch need not be followed, e.g., to completion, prior to jumping to another topic. Conversational response component 216 may determine that switching from a current topic to a future topic is appropriate at any point in a path or branch associated with the current topic. Moreover, the switching of topics need not be predetermined or predefined. Rather, the switching of topics may be based merely upon the direction in which a conversation progresses. Further still, as previously discussed, conversational response component 216 may elect to return to, e.g., a previously discussed topic, but generate responses based upon another path or branch that, as of yet, has not been discussed.

Figure 3:
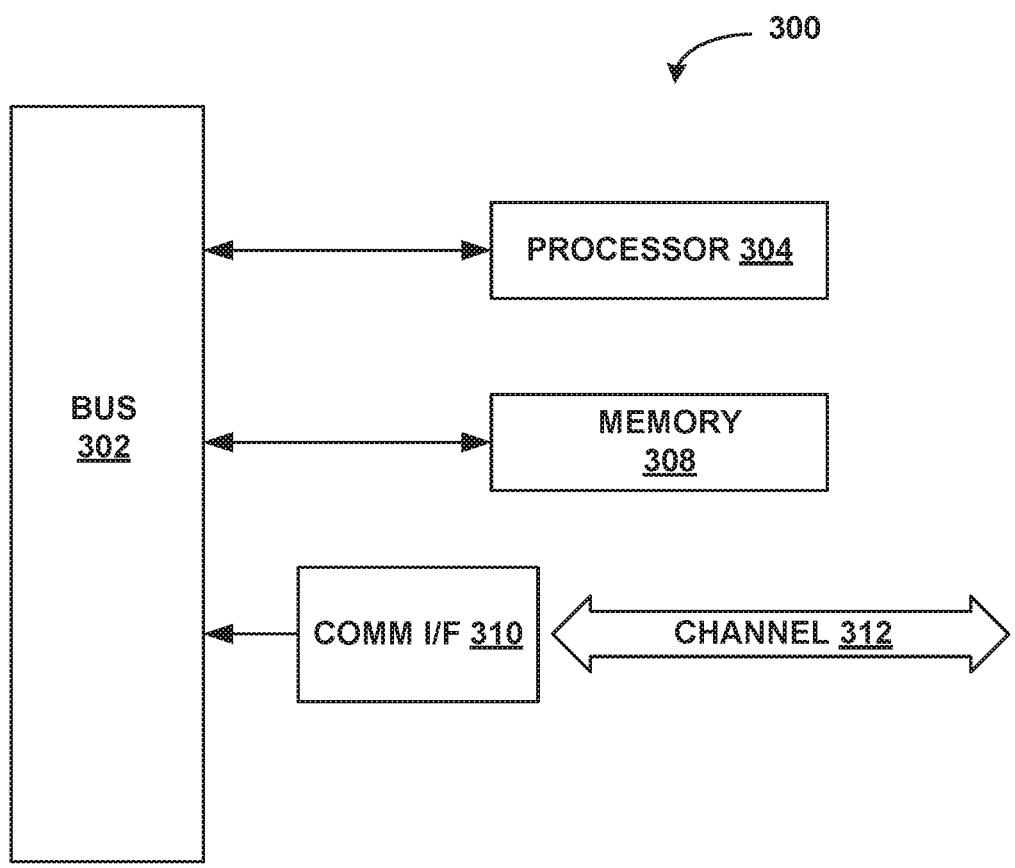
FIG. 3 is an example computing component that may be used to implement various features of embodiments described in the present disclosure.

FIG. 3 illustrates an example computing component that may be used to implement various features of the system and methods disclosed herein, such as the aforementioned features and functionality of one or more of interactive agent 204, user device 208, server 212, conversational response component 216, response data store 218, and/or any of their respective component parts.

As used herein, the term component might describe a given unit of functionality that can be performed in accordance with one or more embodiments of the present application. A component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components.

Where components of the application are implemented in whole or in part using software, in one embodiment, these software elements can be implemented to operate with a computing or processing component capable of carrying out the functionality described with respect thereto. One such example computing component is shown in FIG. 3. Computing component 300 might include, for example, one or more processors, controllers, control components, or other processing devices, such as a processor 304. In the illustrated example, processor 304 is connected to a bus 302, although any communication medium can be used to facilitate interaction with other components of computing component 300.

Computing component 300 might also include one or more memory components, e.g., memory 308. For example, preferably random access memory (RAM) or other dynamic memory, might be used for storing information and instructions to be executed by processor 304. Computing component 300 might likewise include a read only memory ("ROM") or other static storage device coupled to bus 302 for storing static information and instructions for processor 304. Memory 308, or a portion thereof may also be used to store information, and may include a drive or other mechanism to support storage media, such as a solid state drive, an optical disc drive, etc.

Computing component 300 might also include a communications interface 310. Communications interface 310 might be used to allow software and data to be transferred between computing component 300 and external devices. Examples of communications interface 310 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 310 might typically be carried on signals, which can be electronic, electromagnetic (which includes optical) or other signals capable of being exchanged by a given communications interface 310. These signals might be provided to communications interface 310 via a channel 312. This channel 312 might carry signals and might be implemented using a wired or wireless communication medium.

In this document, the terms "computer program medium" and "computer usable medium" are used to generally refer to non-transitory media. These and other various forms of computer program media or computer usable media may be involved in carrying one or more instructions to a processing device for execution. Such instructions embodied on the medium, are generally referred to as "computer program code" or a "computer program product." When executed, such instructions might enable the computing component 300 to perform features or functions of the present application as discussed herein.

Although described above in terms of various exemplary embodiments and implementations, the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method, comprising:
   receiving conversational input associated with a conversation;
   determining, based on a tree structure comprising a plurality of branches representing a respective plurality of conversational topics, and based on a count of a number of nodes remaining in a first branch of the plurality of branches that corresponds to a current conversational topic of the conversational input, a likelihood that the current conversational topic will terminate earlier than desired, wherein each of the plurality of branches comprises a respective plurality of nodes linked by the tree structure;
   based on the determined likelihood, seeking out opportunities to segue the current conversational topic to one or more alternative conversational topics represented by one or more of the nodes and one or more branches of the tree structure other than the first branch, wherein seeking out the opportunities comprises:
      predicting an end to the current conversational topic based on the conversational input and the tree structure; and
      analyzing the conversational input for cues associated with the one or more alternative conversational topics;
   selecting a first alternative conversational topic of the one or more alternative conversational topics, the first alternative conversational topic associated with a second branch of the plurality of branches;
   in response to selecting the first alternative conversational topic, switching from the first branch to the second branch; and
   selecting, based on the second branch, one or more conversational responses associated with the first alternative conversational topic to the conversational input.

2. The method of claim 1, wherein the conversational input is received from a human participant of the conversation.

3. The method of claim 1, wherein predicting the end to the conversation comprises parsing the conversational input, and extracting one or more keywords or phrases indicative of at least one of a context of the conversation, an entity providing the conversational input, and one or more topics relevant to the conversation.

4. The method of claim 3, further comprising characterizing at least one of the context of the conversation, the entity providing the conversational input, and the one or more topics relevant to the conversation based upon one or more biometric identifiers of the entity providing the conversational input.

5. The method of claim 3, further comprising characterizing the one or more topics based upon one or more of the context of the conversation and the entity providing the conversational input.

6. The method of claim 3, further comprising: generating the tree structure, wherein the tree structure characterizes a current state of the conversation.

7. The method of claim 6, further comprising updating the tree structure with additional topics as the conversation progresses based upon additional conversational input.

8. The method of claim 6, wherein predicting the end to the conversation further comprises analyzing the tree structure, and determining which of the one or more alternative conversational topics cannot be associated with at least one of knowledge and pre-scripted responses available for presentation to the provider of the conversational input.

9. The method of claim 8, wherein analyzing the conversational input for conversational continuation topics comprises determining which of the one or more alternative conversational topics are associated with at least one of knowledge and pre-scripted responses available for presentation to the provider of the conversational input.

10. The method of claim 9, wherein analyzing the conversational input comprises determining which of the one or more alternative conversational topics associated with the at least one of the knowledge and pre-scripted responses available for presentation to the provider of the conversational input have been previously discussed during progression of the conversation.

11. The method of claim 10, wherein the one or more conversational responses comprises the at least one of the knowledge and pre-scripted responses available for presentation to the provider of the conversational input that have not been previously discussed during the progression of the conversation.

12. The method of claim 11, wherein the one or more conversational responses to the conversational input is selected based upon non-linear traversal of the tree structure.

13. The method of claim 12, wherein the non-linear traversal of the tree structure comprises selecting the one or more conversational responses to the conversation input that are associated with a sub-topic of one of the one or more topics not previously discussed during the progression of the conversation.

14. The method of claim 12, wherein the non-linear traversal of the tree structure comprises selecting the one or more conversational responses to the conversation input that are associated with a subsequent topic whose subject matter is unrelated to that of a previously discussed topic of the one or more topics.

15. The method of claim 1, wherein predicting the end to the current conversational topic based on the conversational input and the tree structure, comprises: analyzing which of the nodes in the tree structure have been traversed; and determining, based on the analyzed nodes, how close a current state of the conversation is to a potential end.

16. A non-transitory computer-readable storage medium storing instructions that, when executed by a processor, cause the processor to perform a method comprising:
   receiving conversational input associated with a conversation;
   determining, based on a tree structure comprising a plurality of branches representing a respective plurality of conversational topics, and based on a count of a number of nodes remaining in a first branch of the plurality of branches that corresponds to a current conversational topic of the conversational input, a likelihood that the current conversational topic will terminate earlier than desired, wherein each of the plurality of branches comprises a respective plurality of nodes linked by the tree structure;
   based on the determined likelihood, seeking out opportunities to segue the current conversational topic to one or more alternative conversational topics represented by one or more of the nodes and one or more branches of the tree structure other than the first branch, wherein seeking out the opportunities comprises:
      predicting an end to the current conversational topic based on the conversational input and the tree structure; and
      analyzing the conversational input for cues associated with the one or more alternative conversational topics;
   selecting a first alternative conversational topic of the one or more alternative conversational topics, the first alternative conversational topic associated with a second branch of the plurality of branches;
   in response to selecting the first alternative conversational topic, switching from the first branch to the second branch; and
   selecting, based on the second branch, one or more conversational responses associated with the first alternative conversational topic to the conversational input.

17. The non-transitory computer-readable storage medium of claim 16, wherein predicting the end to the conversation comprises parsing the conversational input, and extracting one or more keywords or phrases indicative of at least one of a context of the conversation, an entity providing the conversational input, and one or more topics relevant to the conversation.

18. The non-transitory computer-readable storage medium of claim 17, further comprising characterizing at least one of the context of the conversation, the entity providing the conversational input, and the one or more topics relevant to the conversation based upon one or more biometric identifiers of the entity providing the conversational input.

19. The non-transitory computer-readable storage medium of claim 18, further comprising: generating the tree structure, wherein the tree structure characterizes a current state of the conversation.

20. The non-transitory computer-readable storage medium of claim 19, wherein predicting the end to the conversation further comprises analyzing the tree structure, and determining which of the one or more alternative conversational topics cannot be associated with at least one of knowledge and pre-scripted responses available for presentation to the provider of the conversational input.

* * * * *